Sept. 15, 1970  W. GANTER ET AL  3,528,239

BALANCE CONSTRUCTION

Filed Oct. 3, 1968

INVENTOR.
Wolfgang Ganter
Horst Dinger

BY
Watson, Cole, Grindle & Watson
Attys.

United States Patent Office 3,528,239
Patented Sept. 15, 1970

3,528,239
BALANCE CONSTRUCTION
Wolfgang Ganter, Schramberg-Sulgen, Wurttemberg, and Horst Dinger, Tennenbronn, Wurttemberg, Germany, assignors to Messrs. Gebruder Junghans Gesellschaft mit beschraenkter Haftung, Schramberg, Wurttemberg, Germany, a corporation of Germany
Filed Oct. 3, 1968, Ser. No. 764,891
Claims priority, application Germany, Oct. 4, 1967, J 17,023
Int. Cl. G04c 3/04
U.S. Cl. 58—28                5 Claims

ABSTRACT OF THE DISCLOSURE

A time-keeping electric device particularly for clocks in which a circular carrying plate is mounted on a shaft and the plate having recesses therein, one of which is to receive a permanent magnet and also a spring member on the plate is operative and projects through the recess.

---

This invention relates to time keeping electric devices, particularly electric clocks and watches having a balance gear for electrodynamic drive, whereby a carrying body is provided on a balance shaft and a permanent magnet with drive coil are operatively mounted with counter weight for the eccentric parts of the system. The invention deals with the construction of the working or action arrangement and has for its purpose to construct the parts so that they are as small as possible in order that they can in a simple manner, balance and compensate in operation particularly in connection with automatic machines and devices. The mass for equalization or adjustment for compensation was heretofore arranged by axial parallel removal of worn out material by awkward procedures.

The invention has therefore an object to set the permanent magnet in a space or cut-out portion of the carrying body and by a corresponding mass of the carrying body by additional cut-out parts to provide a mass equalization with the eccentric parts of the elements and with the permanent magnet. One attains thereby a very compact construction of the balance gear. The carrying body is preferably made of brass stamped out of a plate or disc and having a segment-like recess to receive therein a similarly formed permanent magnet. The recess has lateral or side depressions or extended openings and together with the recess for the permanent magnet, it is possible to operate with radially operating work tools, as for example, boring tools in order to remove material from the body adjacent the segment-formed opening for the magnet. A thin ring is provided around the outer peripheral surface of the segment-formed magnet. Finally it is possible to provide means to mount a switching spring for the switch wheel of the indicator drive gear, in that, in a front side of the disc a boring can be provided to frictionally receive a holding bushing for the switching spring. The disc has a depression therein with side surfaces to receive the free end of the switching spring.

Further objects will be apparent from the following description when considered in connection with the accompanying drawing in which.

Figure 2:
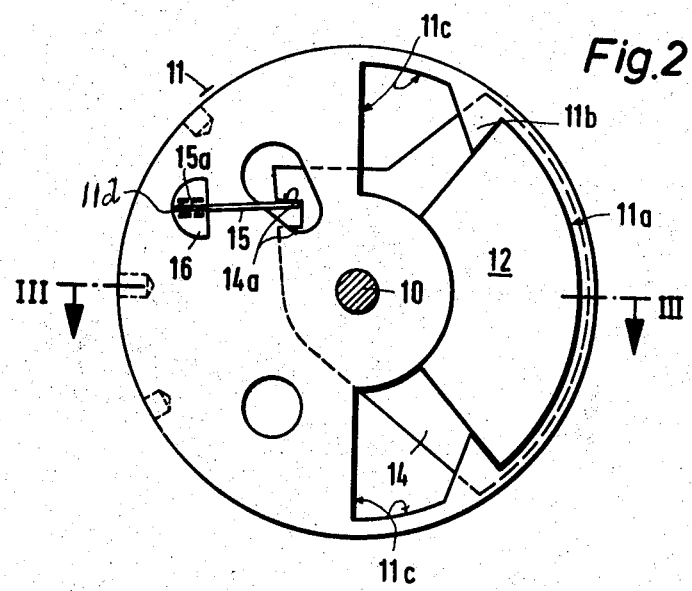
FIG. 2 is a plan view partly in section taken on line II—II of FIG. 1 in the direction of the arrows.
Figure 3:
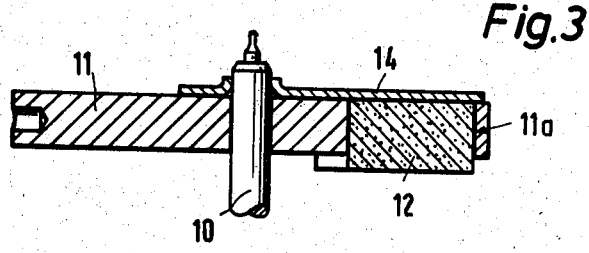
FIG. 3 is a cross-section taken on line III—III of FIG. 2 in the direction of the arrows.

A thick carrying plate or disc 11 stamped out of preferably brass, is mounted on the balance shaft 10 by being forced thereon and is provided with a segment-like depression 11a into which the permanent magnet 12 is depressed therein, preferably by being cemented therein. The magnet 12 has two ends as shown in FIG. 2. Noses or projections 11b will additionally hold the permanent magnet 12 in place and the depression 11a extends from both sides or ends to depressions 11c the latter of which remain empty. The depressions 11c serve the purpose to equalize or compensate the mass relative to the equally secured back or side closure discs 13 and 14 mounted on the balance shaft 10. The thickness of the disc 11 is only slightly smaller than the height or thickness of the permanent magnet 12.

Figure 1:
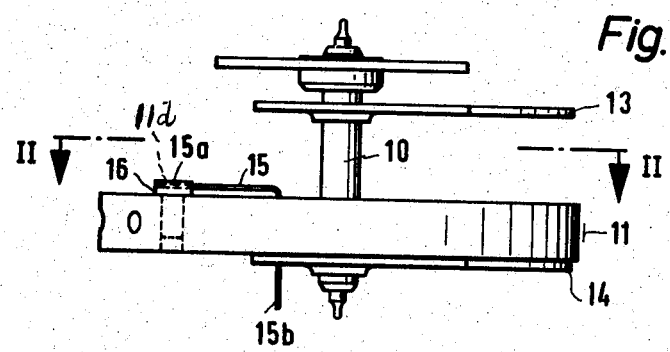
FIG. 1 is a side view of the balance wheel assembly.

An indicator pointer drive from a drive wheel, not shown, is driven by a drive spring 15. This spring is secured in a slot 11d of a bushing or mount 16 at 15a by frictional insertion and its free outer end 15b, FIG. 1, projects through the plate 11 below the underside of the carrying plate or disc 11. On a back plate 14, there are provided side cut-out portions 14a for the contact or switch spring 15, 15b and they can be provided also in the disc 11 itself.

We claim:

1. A balance gear for electrodynamic drive comprising a shaft, a circular carrying plate which is disc shaped and is mounted on the shaft and having recesses therein, a permanent magnet mounted in one of the recesses and having two ends, said last-mentioned recess having a pair of spaced projections directed toward the shaft to aid in holding the magnet in place in its recess, and the recesses in the plate including also one at each end of the magnet adjacent the projections, said magnet and plate being approximately flush on one side and having approximately the same thickness.

2. A balance gear according to claim 1, in which the plate is stamped from brass plate.

3. A balance gear according to claim 1, in which the carrying plate is composed of brass and is a stamping, and said recess in which the permanent magnet is provided is segment shaped for the similarly formed permanent magnet.

4. A balance gear according to claim 1, in which a closure disc is provided on each side of the plate to at least partly close the recess and at least one plate closing over the magnet.

5. A balance gear according to claim 1, in which a mount is provided in a recess in the plate and having a bushing in the last-mentioned recess with a spring secured thereon projecting through a recess in the plate from one side and projecting through to the other side of the plate, said spring being adapted to drive a pointer drive.

References Cited

UNITED STATES PATENTS 3,161,012   12/1964   Hug et al. _____ 58—28

RICHARD B. WILKINSON, Primary Examiner

E. C. SIMMONS, Assistant Examiner

U.S. Cl. X.R.

58—107